United States Patent
Venkatasubramanian et al.

(10) Patent No.: US 10,250,349 B2
(45) Date of Patent: Apr. 2, 2019

(54) COORDINATED INTERFERENCE CANCELLATION IN WIRELESS NETWORK

(71) Applicant: Nokia Solutions and Networks Sp. z.o.o., Warsaw (PL)

(72) Inventors: Venkatkumar Venkatasubramanian, Wroclaw (PL); Anna Maria Lukowa, Prabuty (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/566,209

(22) PCT Filed: Apr. 15, 2015

(86) PCT No.: PCT/EP2015/058154
§ 371 (c)(1),
(2) Date: Oct. 12, 2017

(87) PCT Pub. No.: WO2016/165753
PCT Pub. Date: Oct. 20, 2016

(65) Prior Publication Data
US 2018/0123719 A1     May 3, 2018

(51) Int. Cl.
*H04B 7/24* (2006.01)
*H04J 11/00* (2006.01)
(Continued)

(52) U.S. Cl.
CPC ............ *H04J 11/005* (2013.01); *H04B 7/024* (2013.01); *H04B 7/063* (2013.01); *H04B 7/0628* (2013.01); *H04L 1/00* (2013.01); *H04L 27/2647* (2013.01)

(58) Field of Classification Search
CPC ..... H04J 11/005; H04L 27/2647; H04B 7/063
See application file for complete search history.

(56) References Cited

U.S. PATENT DOCUMENTS

| 8,843,069 B2 | 9/2014 | Borran et al. |
| 10,051,515 B2 * | 8/2018 | Centonza ............. H04W 28/04 |

(Continued)

FOREIGN PATENT DOCUMENTS

| EP | 2413514 A1 | 2/2012 |
| EP | 2840832 A1 | 2/2015 |

(Continued)

OTHER PUBLICATIONS

International Search Report and Written Opinion for International Application No. PCT/EP2015/058154, dated Dec. 21, 2015 (21 pages).

*Primary Examiner* — Dac V Ha
(74) *Attorney, Agent, or Firm* — Brake Hughes Bellermann LLP

(57) ABSTRACT

An example technique includes receiving, by a user device, a first signal including a first user device-specific signal from a base station and one or more interfering signals, the first user device-specific signal being received based on a first modulation and coding scheme (MCS), determining, by the user device, whether the user device can perform interference cancellation for the one or more interfering signals, sending, by the user device to the base station, an interference cancellation feedback message including at least, for each of the one or more interfering signals, an interference cancellation capability indication that indicates whether or not the user device can perform interference cancellation for the interfering signal, receiving an updated MCS, wherein the updated MCS is based, at least in part, on the interference from the interference cancellation feedback message, and receiving, by the user device based on the updated MCS, a second signal.

14 Claims, 6 Drawing Sheets

(51) Int. Cl.
  *H04B 7/024* (2017.01)
  *H04B 7/06* (2006.01)
  *H04L 1/00* (2006.01)
  *H04L 27/26* (2006.01)

(56) References Cited

U.S. PATENT DOCUMENTS

| | | |
|---|---|---|
| 2012/0329400 A1 | 12/2012 | Seo et al. |
| 2013/0044697 A1* | 2/2013 | Yoo ............... H04W 72/082 370/329 |
| 2014/0187255 A1 | 7/2014 | Dimou et al. |
| 2014/0293971 A1 | 10/2014 | Yoo et al. |
| 2014/0334440 A1 | 11/2014 | Wong et al. |
| 2015/0172035 A1* | 6/2015 | Xu ............... H04L 5/0073 370/329 |
| 2015/0256280 A1* | 9/2015 | Park ............... H04J 11/005 370/329 |
| 2015/0358974 A1* | 12/2015 | Jung ............... H04W 72/048 370/329 |
| 2016/0080963 A1* | 3/2016 | Marinier ............... H04L 5/0053 370/252 |

FOREIGN PATENT DOCUMENTS

| | | |
|---|---|---|
| EP | 2840833 A1 | 2/2015 |
| WO | 2014182541 A2 | 11/2014 |

\* cited by examiner

US 10,250,349 B2

COORDINATED INTERFERENCE CANCELLATION IN WIRELESS NETWORK

CROSS-REFERENENCE TO RELATED APPLICATIONS

This application is a national stage entry of PCT Application No. PCT/EP2015/058154 filed Apr. 15, 2015, entitled "COORDINATED INTERFERENCE CANCELLATION IN WIRELESS NETWORK" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. SUTRA (evolved UMTS Terrestrial Radio Access) is the air interface of 3GPP's Long Term Evolution (LTE) upgrade path for mobile networks. In LTE, base stations, which are referred to as evolved Node Bs (eNBs), provide wireless access within a coverage area or cell. In LTE, mobile devices, or mobile stations are referred to as a user equipment (UE). LTE has included a number of improvements or developments. 5G wireless networks are also being developed.

SUMMARY

According to an example implementation, a method may include receiving, by a user device, a first signal including a first user device-specific signal from a base station and one or more interfering signals, the first user device-specific signal being received based on a first modulation and coding scheme (MCS); determining, by the user device, whether the user device can perform interference cancellation for the one or more interfering signals; sending, by the user device to the base station, an interference cancellation feedback message including at least, for each of the one or more interfering signals, an interference cancellation capability indication that indicates whether or not the user device can perform interference cancellation for the interfering signal; receiving an updated MCS, wherein the updated MCS is based, at least in part, on the interference cancellation feedback message; and receiving, by the user device based on the updated MCS, a second signal including at least a second user device-specific signal in which at least one of a signal muting or an interference cancellation is performed for at least one of the interfering signals.

According to another example implementation, an apparatus may include means for receiving, by a user device, a first signal including a first user device-specific signal from a base station and one or more interfering signals, the first user device-specific signal being received based on a first modulation and coding scheme (MCS); means for determining, by the user device, whether the user device can perform interference cancellation for the one or more interfering signals; means for sending, by the user device to the base station, an interference cancellation feedback message including at least, for each of the one or more interfering signals, an interference cancellation capability indication that indicates whether or not the user device can perform interference cancellation for the interfering signal; means for receiving an updated MCS, wherein the updated MCS is based, at least in part, on the interference cancellation feedback message; and means for receiving, by the user device based on the updated MCS, a second signal including at least a second user device-specific signal in which at least one of a signal muting or an interference cancellation is performed for at least one of the interfering signals.

According to another example implementation, an apparatus may include at least one processor and at least one memory including computer instructions, when executed by the at least one processor, cause the apparatus to: receive, by a user device, a first signal including a first user device-specific signal from a base station and one or more interfering signals, the first user device-specific signal being received based on a first modulation and coding scheme (MCS); determine, by the user device, whether the user device can perform interference cancellation for the one or more interfering signals; send, by the user device to the base station, an interference cancellation feedback message including at least, for each of the one or more interfering signals, an interference cancellation capability indication that indicates whether or not the user device can perform interference cancellation for the interfering signal; receive an updated MCS, wherein the updated MCS is based, at least in part, on the interference cancellation feedback message; and receive, by the user device based on the updated MCS, a second signal including at least a second user device-specific signal in which at least one of a signal muting or an interference cancellation is performed for at least one of the interfering signals.

According to another example implementation, a computer program product may include a non-transitory computer-readable storage medium and storing executable code that, when executed by at least one data processing apparatus, is configured to cause the at least one data processing apparatus to perform a method including: receiving, by a user device, a first signal including a first user device-specific signal from a base station and one or more interfering signals, the first user device-specific signal being received based on a first modulation and coding scheme (MCS); determining, by the user device, whether the user device can perform interference cancellation for the one or more interfering signals; sending, by the user device to the base station, an interference cancellation feedback message including at least, for each of the one or more interfering signals, an interference cancellation capability indication that indicates whether or not the user device can perform interference cancellation for the interfering signal; receiving an updated MCS, wherein the updated MCS is based, at least in part, on the interference cancellation feedback message; and receiving, by the user device based on the updated MCS, a second signal including at least a second user device-specific signal in which at least one of a signal muting or an interference cancellation is performed for at least one of the interfering signals.

According to another example implementation, a method may include receiving, by a victim base station, a first signal from a user device and one or more interfering signals, the first signal being received based on a first modulation and coding scheme (MCS); determining, by the victim base station, whether the victim base station can perform interference cancellation for the one or more interfering signals; sending, by the victim base station to one or more neighbor base stations, an interference cancellation signaling message including at least, for each of the one or more interfering signals, an interference cancellation capability indication that indicates whether or not the victim base station can perform interference cancellation for the interfering signal; determining an updated MCS; and receiving, by the victim base station based on the updated MCS, at least a second signal, in which at least one of a signal muting or an interference cancellation is performed for at least one of the interfering signals.

According to another example implementation, an apparatus may include means for receiving, by a victim base station, a first signal from a user device and one or more interfering signals, the first signal being received based on a first modulation and coding scheme (MCS); means for determining, by the victim base station, whether the victim base station can perform interference cancellation for the one or more interfering signals; means for sending, by the victim base station to one or more neighbor base stations, an interference cancellation signaling message including at least, for each of the one or more interfering signals, an interference cancellation capability indication that indicates whether or not the victim base station can perform interference cancellation for the interfering signal; means for determining an updated MCS; and means for receiving, by the victim base station based on the updated MCS, at least a second signal, in which at least one of a signal muting or an interference cancellation is performed for at least one of the interfering signals.

According to another example implementation, an apparatus may include at least one processor and at least one memory including computer instructions, when executed by the at least one processor, cause the apparatus to: receive, by a victim base station, a first signal from a user device and one or more interfering signals, the first signal being received based on a first modulation and coding scheme (MCS); determine, by the victim base station, whether the victim base station can perform interference cancellation for the one or more interfering signals; send, by the victim base station to one or more neighbor base stations, an interference cancellation signaling message including at least, for each of the one or more interfering signals, an interference cancellation capability indication that indicates whether or not the victim base station can perform interference cancellation for the interfering signal; determine an updated MCS; and receive, by the victim base station based on the updated MCS, at least a second signal, in which at least one of a signal muting or an interference cancellation is performed for at least one of the interfering signals.

According to another example implementation, a computer program product may include a non-transitory computer-readable storage medium and storing executable code that, when executed by at least one data processing apparatus, is configured to cause the at least one data processing apparatus to perform a method including: receiving, by a victim base station, a first signal from a user device and one or more interfering signals, the first signal being received based on a first modulation and coding scheme (MCS); determining, by the victim base station, whether the victim base station can perform interference cancellation for the one or more interfering signals; sending, by the victim base station to one or more neighbor base stations, an interference cancellation signaling message including at least, for each of the one or more interfering signals, an interference cancellation capability indication that indicates whether or not the victim base station can perform interference cancellation for the interfering signal; determining an updated MCS; and receiving, by the victim base station based on the updated MCS, at least a second signal, in which at least one of a signal muting or an interference cancellation is performed for at least one of the interfering signals.

According to another example implementation, a method may include transmitting, by a victim base station to a user device based on a first modulation and coding scheme (MCS), a first user device-specific signal; receiving, by the victim base station from the user device, an interference cancellation feedback message including at least, for each of one or more interfering signals, an interference cancellation capability indication that indicates whether or not the user device can perform interference cancellation for the interfering signal; sending, by the victim base station to one or more neighbor base stations, an interference cancellation signaling message including at least, for each of the one or more interfering signals, the interference cancellation capability indication that indicates whether or not the interference cancellation can be performed for the interfering signal; receiving, by the victim base station from one or more of the neighbor base stations in response to the interference cancellation signaling message, a muting response that indicates whether one or more of the interfering signals will be muted (turned Off) by a neighbor base station; determining an updated MCS based at least on the muting response; and sending the updated MCS to the user device.

According to an example implementation, an apparatus may include means for transmitting, by a victim base station to a user device based on a first modulation and coding scheme (MCS), a first user device-specific signal; means for receiving, by the victim base station from the user device, an interference cancellation feedback message including at least, for each of one or more interfering signals, an interference cancellation capability indication that indicates whether or not the user device can perform interference cancellation for the interfering signal; means for sending, by the victim base station to one or more neighbor base stations, an interference cancellation signaling message including at least, for each of the one or more interfering signals, the interference cancellation capability indication that indicates whether or not the interference cancellation can be performed for the interfering signal; receiving, by the victim base station from one or more of the neighbor base stations in response to the interference cancellation signaling message, a muting response that indicates whether one or more of the interfering signals will be muted (turned Off) by a neighbor base station; means for determining an updated MCS based at least on the muting response; and means for sending the updated MCS to the user device.

According to another example implementation, an apparatus may include at least one processor and at least one memory including computer instructions, when executed by the at least one processor, cause the apparatus to: transmit, by a victim base station to a user device based on a first modulation and coding scheme (MCS), a first user device-specific signal; receive, by the victim base station from the user device, an interference cancellation feedback message including at least, for each of one or more interfering signals, an interference cancellation capability indication that indicates whether or not the user device can perform interference cancellation for the interfering signal; send, by the victim base station to one or more neighbor base stations, an interference cancellation signaling message including at least, for each of the one or more interfering signals, the interference cancellation capability indication that indicates whether or not the interference cancellation can be performed for the interfering signal; receive, by the victim base station from one or more of the neighbor base stations in response to the interference cancellation signaling message, a muting response that indicates whether one or more of the interfering signals will be muted (turned Off) by a neighbor base station; determine an updated MCS based at least on the muting response; and send the updated MCS to the user device.

According to another example implementation, a computer program product may include a non-transitory computer-readable storage medium and storing executable code that, when executed by at least one data processing apparatus, is configured to cause the at least one data processing apparatus to perform a method including: transmitting, by a victim base station to a user device based on a first modulation and coding scheme (MCS), a first user device-specific signal; receiving, by the victim base station from the user device, an interference cancellation feedback message including at least, for each of one or more interfering signals, an interference cancellation capability indication that indicates whether or not the user device can perform interference cancellation for the interfering signal; sending, by the victim base station to one or more neighbor base stations, an interference cancellation signaling message including at least, for each of the one or more interfering signals, the interference cancellation capability indication that indicates whether or not the interference cancellation can be performed for the interfering signal; receiving, by the victim base station from one or more of the neighbor base stations in response to the interference cancellation signaling message, a muting response that indicates whether one or more of the interfering signals will be muted (turned Off) by a neighbor base station; determining an updated MCS based at least on the muting response; and sending the updated MCS to the user device.

The details of one or more implementations are set forth in the accompanying drawings and the description below. Other features will be apparent from the description and drawings, and from the claims.

DETAILED DESCRIPTION

Figure 1:
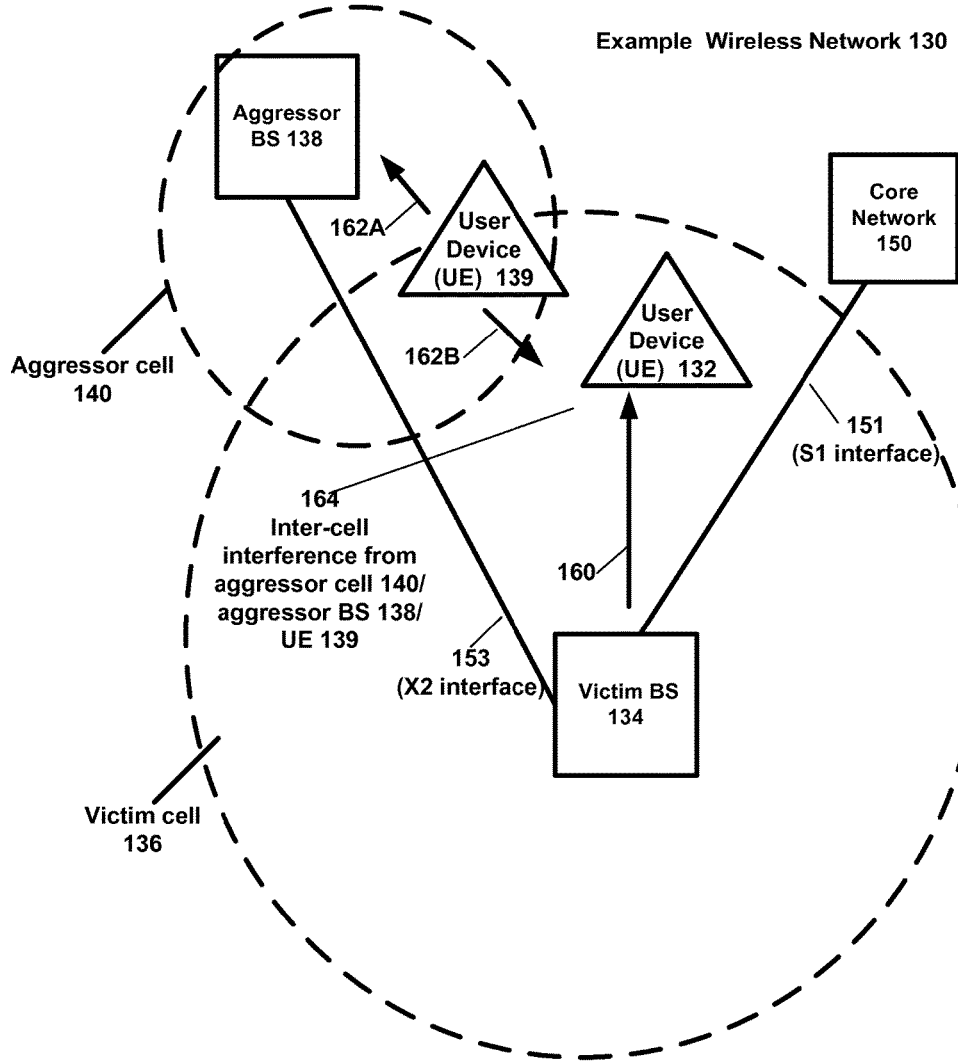
FIG. 1 is a block diagram of a wireless network according to an example implementation.

FIG. 1 is a block diagram of a wireless network 130 according to an example implementation. In the wireless network 130 of FIG. 1, inter-cell interference may occur between an aggressor cell 140 and a victim cell 136. In this illustrative example, the aggressor cell 140 may generate or transmit one or more interfering signals that may interfere with the operation of one or more network nodes within the victim cell 136. In an example implementation, a network node may include (or may be) a user device or UE, and/or a base station (BS) or evolved Node Bs (eNBs).

According to an example implementation, the term aggressor may generally refer to one or more network nodes (e.g., BSs, user devices) or cells that generate or transmit interfering signals that interfere with and/or inhibit the reception of signals and/or inhibit the operation of one or more network nodes at a victim cell. Thus, aggressor may refer to one or more interferers or entities that generate an interfering signal, while victim may refer to one or more entities that are interfered with or may be negatively impacted due to the interfering signal. Although any BS or user device may be both an aggressor and a victim, depending on the resource, the cells, transmission schedule, etc. For example, in many cases, a victim cell may be a neighbor to or in close proximity to an aggressor cell, e.g., thereby allowing a signal transmitted by the aggressor cell to be received by the victim cell, according to an illustrative example.

Referring to FIG. 1, BS 134 may provide wireless services within victim cell 136, while aggressor BS 138 may provide wireless services within aggressor cell 140. User device 132, which may also be referred to as a user equipment (UE), may be connected to (and in communication with) victim BS 134. Similarly, user device 139 may be connect to (and in communication with) aggressor BS 138. While only two user devices 132, 139 are shown, any number of user devices (or UEs) may be connected to each BS. Thus, with reference to FIG. 1, in an illustrative example implementation, user device 132 may receive wireless services via victim BS 134/victim cell 136, while user device 139 may receive wireless services via aggressor BS 138/aggressor cell 140. In some cases, at least part of the functionalities of a base station or (e)Node B (eNB) may be also be carried out by any node, server or host which may be operably coupled to a transceiver, such as a remote radio head.

BS 134 is also connected to a core network 150 via a 51 (BS-core network) interface 151. BS 138 may also be connected to core network 150. Aggressor BS 138 may be connected via an X2 (or a BS-BS) interface 153 to victim BS 134. In this illustrative example, only two BSs/cells are shown, and only one user device/UE per cell, but any number of cells/BSs and/or user devices may be provided.

According to an example implementation, a user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an illustrative example), the core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

According to an example implementation, two or more cells (including network nodes, e.g., BSs, user devices within those cells) may use one or more common time/frequency resources (e.g., resource blocks) to transmit information. Also, in some cases, if those cells are in proximity to each other, a transmission from one cell may cause interference with another (e.g., neighbor or adjacent) cell.

For example, as shown in FIG. 1, at 160, a victim BS 134 may be transmitting (uplink) to user device 132 via a first time/frequency resource. A user device 139 (e.g., at a neighbor or adjacent cell) may also be transmitting at 162A to aggressor BS 138, e.g., where the signal transmitted by user device 139 may also be transmitted to and/or received by user device 132, as shown by 162B. Thus, as shown by 164, the signal transmitted from user device 139, if sufficiently near (or close) to cell 136 and/or having sufficient transmission power, may be received by user device 132 as inter-cell interference. Thus, in such case, the signal 162A/162B from the aggressor cell may be received by user device 132 as interference and may reduce the signal-to-interference-plus-noise ratio (SINR) of the signal received by user device 132 from its BS 134.

For interfering signals that are below a threshold (e.g., less then 3 dB below the strength of the received signal at a victim user device/BS from a connected BS/user device within the victim cell, or alternatively at a same signal strength or greater than the received signal from within the victim cell), such interfering signals may be ignored by the victim user devices and BSs. However, in some cases, a strong interfering signal may be received, e.g., above a threshold signal strength (as measured by the receiving victim BS 134 or victim user device 132 within the victim cell 136), then such interfering signal may, at least in some cases, create a significant problem for the victim BS or user device.

According to an example implementation, two different techniques may be used to decrease interference from interfering signals: 1) an interfering signal may be decoded by a victim BS or victim user device, and then the decoded interfering signal may be subtracted (post-decoding) from the total or cumulative signal received by the victim BS/victim user device, e.g., in order to increase SINR or channel quality of the received signal at the victim BS/victim user device. And, 2) a request (e.g., muting request) may be sent to the aggressor cell that requests the aggressor cell to mute (e.g., turn Off, or cease the transmission of) the interfering signal, which will also likely increase the SINR or channel quality of the received signal. For example, signals (e.g., interfering signals) from other cells (e.g., aggressor cell 140) would be received within victim cell (e.g., user device 132 or victim BS 134) as noise or interference. Thus, either muting (or turning Off) such interfering signal or cancelling such interfering signal at a receiving node may increase the SINR or channel quality of a signal received within the victim cell 136 (e.g., increase the SINR or channel quality of a signal received by user device 132 from its connected BS, or increase the SINR or channel quality of a signal received by BS 134 from its connected user device 132). Various techniques are described herein that may coordinate the cancellation of an interfering signal (e.g., when cancellation of the interfering signal is possible) and/or muting of an interfering signal (e.g., when cancellation is not possible), which may provide increased channel quality (e.g., increased SINR) and/or may improve data throughput within a network, according to an example implementation.

Figure 2:
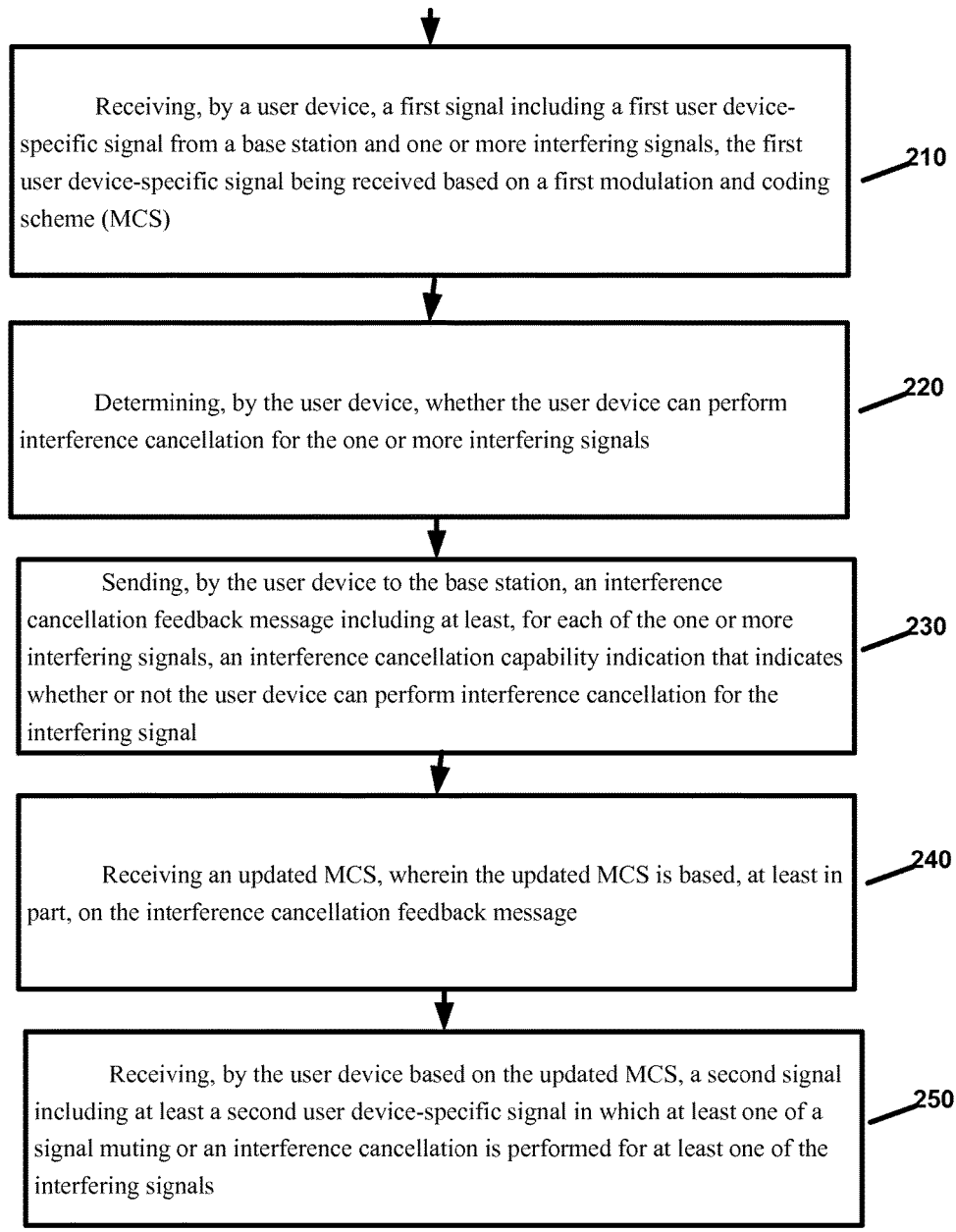
FIG. 2 is a diagram illustrating operation of a user device according to an example implementation.

FIG. 2 is a flow chart illustrating operation of a user device according to an example implementation. Operation 210 may include receiving, by a user device (e.g., user device 132 within victim cell 136), a first signal including a first user device-specific signal from a base station (e.g., from BS 134) and one or more interfering signals (e.g., including an interfering signal from aggressor cell 140), the first user device-specific signal being received based on a first modulation and coding scheme (MCS). For example, a user device-specific signal may include a signal transmitted from BS 134 to user device 132 that may include user device-specific precoding and/or user device-specific multi-input, multi-output (MIMO) weights applied to the signal, where the precoding and/or MIMO weights are specific to user device 132 (e.g., specific to the channel between BS 134 and user device 132), for example. In operation 210, the first (or initial) MCS may be the MCS used by BS 134 to transmit data, pilot signals, reference signals (or other signals) to user device 132, for example. For example, this initial or first MCS may not typically be adjusted or updated to reflect a muting and/or cancellation of an interfering signal. A subsequent (or second) transmission within victim cell 140 may use an updated/revised MCS that may be updated or adjusted to account for a cancellation and/or muting of one or more interfering signals (thus, creating an increased channel quality/SINR, and thereby allowing a higher MCS to be used within victim cell 140), as described below in operations 240 and 250.

As noted in operation 210, the receiving (by user device 132) of the first signal may include receiving both: a first user device-specific signal, and one or more interfering signals, e.g., from one or more aggressor cells, such as from aggressor cell 140 (as an example). As described in greater detail herein, one or more techniques may be used to either cancel (via interference cancellation performed by the receiving network node within the victim cell) one or more of the interfering signals and/or cause/request the aggressor cell to mute (e.g., cause the aggressor cell to turn Off, cease transmission, or not to transmit) one or more of the interfering signals.

Referring to FIG. 2, operation 220 may include determining, by the user device, whether the user device can perform interference cancellation for the one or more interfering signals. For example, user device may perform channel estimation and calculate a SINR (signal-to-interference-plus-noise ratio) in order to estimate whether the user device is capable of decoding one or more of the interfering signals. Alternatively, SINR may be calculated through other techniques. If the user device 132 can decode a signal, then the user device can then subtract the decoded (interfering) signal from the signal(s) it received at the same time or via the same time-frequency resources. In order to decode an interfering signal(s), the user device may receive the MCS (modulation and coding scheme), scheduling information, spatial layers, etc. for one or more interfering signals. For example, the serving BS (victim BS 134) for user device 132 may request and obtain MCS and scheduling information for one or more interfering signals from one or more aggressor BSs/cells, and may then forward that MCS and scheduling information for interfering signals to the user device 132. User device 132 may then use channel estimation and/or may attempt to decode the interfering signal(s), e.g., based on the MCS and/or scheduling information received for one or more interfering signals. These are some illustrative example techniques that may be used by user device 132 to determine if it is capable of performing interference cancellation on one or more interfering signals.

Operation 230 may include sending, by the user device (e.g., user device 132) to the base station (e.g., to victim/ serving BS 134), an interference cancellation feedback message including at least, for each of the one or more interfering signals, an interference cancellation capability indication that indicates whether or not the user device can perform interference cancellation for the interfering signal. For example, the interference cancellation feedback message may include for each interfering signal, a field or information element that indicates: IC capable, or IC not capable, where IC refers to interference cancellation. The interference cancellation feedback message from the user device 132 to BS 134 may include other fields or other information, as described in greater detail herein.

Operation 240 may include receiving (e.g., by user device 132) an updated MCS (modulation and coding scheme), wherein the updated MCS is based, at least in part, on the interference cancellation feedback message. According to one illustrative and nonlimiting example, the user device 132 may receive an updated MCS from BS 134, where the updated MCS will be used by the BS 134 and user device 132 to communicate information between the BS 134 and user device 132. For example, victim BS 134 may send an interference cancellation signaling message to one or more neighbor BSs (e.g., to one or more aggressor BSs), including the interference cancellation capability indication (IC capable/IC not capable) for one or more interfering signals. One or more neighbor/aggressor BSs may then make a muting decision for one or more interfering signals that were identified as IC not capable in the interference cancellation signaling message from the victim BS.

For example, an aggressor BS may determine whether or not to mute an interfering signal (from a UE within an aggressor cell or from the aggressor BS itself) based on various criteria or parameters, such as the interference capability indication (e.g., indicating IC not capable, which is interpreted as a muting request from victim BS 134), the priority of the victim cell vs. the priority of the aggressor cell for such resource, the delay of packets/data within the victim cell and the aggressor cell, and the channel quality (e.g., CQI/channel quality indication) or MCS increase or signal gains that may be obtained within the victim cell if muting is performed. Thus, one or more aggressor BSs/cells may perform a cost/benefit analyses for the muting request to determine whether the aggressor cell/aggressor BS will actually mute the interfering signal for which the victim BS 134 has requested muting. For example, if the benefit to the victim cell is low, and/or the aggressor cell has a higher priority than victim cell for the resource, and/or there is significant delay being experienced at the aggressor cell, then the aggressor cell may decide not to mute. On the other hand, if there is a significant signaling gain (e.g., MCS or CQI) benefit to the victim cell (or to victim cells) obtained by muting the interfering signal, and/or the victim cell has a higher priority for the resource as compared to the aggressor cell, then the aggressor cell may elect to mute the interfering signal as requested. An interfering signal from an aggressor cell may be interfering with multiple neighbor cells. Thus, for example, an aggressor BS may receive interference cancellation signaling messages from multiple victim (neighbor) BSs, and may consider the overall impact or benefit (e.g., cumulative increase in signaling gains, CQI and/or cumulative increase in data throughput obtained via muting) across multiple neighbor/victim cells, when determining whether to mute an interfering signal for a resource.

According to an example implementation, the victim BS man then receive a muting decision from one or more aggressor BSs, e.g., indicating whether or not the aggressor cell will mute the interfering signal. Based on the muting decision (indicating whether an aggressor cell will mute the interfering signal), the interference cancellation feedback message(s) from user device 132, and possibly other information, the victim BS may determine an updated MCS. According to an illustrative example implementation, the victim BS 134 may assume that the user device 132 will perform interference cancellation for any interfering signals indicated as IC capable (within the interference cancellation feedback message). The victim BS 134 may also assume that an aggressor BS(s) will mute an interfering signal that the aggressor indicated would be muted (e.g., as indicated by the muting decision sent by the aggressor BS to victim BS 134). Thus, based on the cancellation of one or more interfering signals, and/or based on the muting of one or more interfering signals, the victim may determine or estimate a SINR for a signal received by user device 132, and an associated CQI (channel quality indication) and (updated) MCS for such SINR. Thus, for example, based on the cancellation and/or muting of one or more interfering signals, the victim BS 134 may determine/estimate an updated MCS for the user device 132, e.g., which may be a higher MCS, allowing greater data throughput for example (based on the expected muting and/or cancellation of one or more interfering signals). Thus, operation 240 may include the user device 132 receiving the updated MCS from the victim BS 134, for example.

Operation 250 may include receiving, by the user device (e.g., user device 132) based on the updated MCS, a second signal including at least a second user device-specific signal in which at least one of a signal muting or an interference cancellation is performed for at least one of the interfering signals. Thus, for example, in operation 250, the user device 132 may receive and decode the signal from the BS 134 using the updated MCS, which may allow greater throughput or greater data rates, e.g., based on a higher MCS, as compared to the first/initial MCS. In this example, one or more aggressor BSs may mute an interfering signal (as indicated by the muting decision sent to the victim BS), and the user device 132 may perform interference cancellation (signal cancellation performed post decoding of the interfering signal) for one or more interfering signals. In this manner, one or more strong interfering signals (e.g., greater than a threshold received signal strength) that can be cancelled at the user device/receiving network node are allowed/permitted to be transmitted (e.g., no muting request is sent if interfering signal can be cancelled), while a muting request (e.g., IC not capable indication sent to aggressor BS) may be submitted to an aggressor BS to request a muting of such interfering signal that cannot be cancelled by the user device or receiving node, for example.

According to another example implementation of the method of FIG. 2, the receiving a second signal may include: receiving, by the user device based on the updated MCS, a second signal including at least a second user device-specific signal in which at least one of the following is performed for the second signal: a signal muting is performed by a neighbor base station (e.g., BS 138) for at least a first interfering signal of the one or more interfering signals in which the user device is not capable of performing interference cancellation for the first of the interfering signals; and interference cancellation is performed by the user device (e.g., user device 132) to cancel a second of the interfering signals from the second signal if interference cancellation can be performed by the user device for the second interfering signal. For example, the capability of the user device to cancel an interfering signal may be indicated by a IC capable/IC not capable field that may be provided in an interference cancellation feedback message sent from the user device 132 to the victim/serving BS 134. And, a muting decision may be sent (e.g., in response to a muting request or IC not capable indication provide in an interference cancellation signaling message from victim BS 134) by one or more aggressor BSs to the victim BS 134.

According to another example implementation of the method of FIG. 2, the determining, by the user device, whether the user device can perform interference cancellation for the one or more interfering signals may include determining, by the user device, whether the user device can decode the one or more interfering signals.

According to another example implementation of the method of FIG. 2, interference cancellation capability indication may be provided for a resource, and for each of a plurality of spatial layers, based on whether or not the user device can decode the interfering signal via each of the spatial layers. Thus, for example, a user device may be able to decode (or perform interference cancellation) for a signal received via one or more (or even all) spatial layers, where a spatial layer may be associated with a transmit antenna/receive antenna path, and where there may be multiple transmit antennas and/or multiple receive antennas. Thus, for example, the user device 132 may provide an interference cancellation capability indication for a signal for each of the spatial layers, e.g., indicating whether or not the user device 132 can cancel the signal on the spatial layer (or on each spatial layer). According to an example implementation, the victim BS 134 may receive the interference cancellation capability indications for all of the spatial layers for a signal from user device 132. According to an example implementation, victim BS 134 may determine that the user device 132 can cancel the interfering signal only if interference cancellation can be performed by user device 132 for the signal for all spatial layers. Thus, the BS 134 may send an IC capable indication to an aggressor BS if the user device can cancel the interfering signal for all spatial layers. And, the BS 134 may send an IC not capable indication for the interfering signal to an aggressor BS(s) if the user device 132 cannot cancel the interfering signal on one or more spatial layers, for example.

According to another example implementation of the method of FIG. 2, the interference cancellation feedback message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be Off, and/or the user device performing interference cancellation for an interfering signal proposed to be On.

According to another example implementation of the method of FIG. 2, the interference cancellation feedback message may include for each of one or more transmission hypothesis: an On/Off indication for each of the one or more interfering signals that indicates a proposal to turn the interfering signal On (allow transmission of interfering signal) or Off (muted/no transmission of interfering signal) for the transmission hypothesis; an interference cancellation capability indication for the interfering signal that indicates whether the user device can perform interference cancellation for the interfering signal; and a channel quality indication for the transmission hypothesis that indicates an estimated channel quality, such as a CQI (or an estimated channel quality gain or signal quality gain, such as a CQI gain or MCS gain) that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis. According to an example implementation, the channel quality or signal quality associated with a transmission hypothesis may, for example be identified as a CQI (which may be, for example, a number between 0 and 15), or a MCS (modulation and coding scheme, where a different MCS may correspond to each different CQI value. Alternatively, a signal gain or channel quality gain may be identified for each transmission hypothesis, e.g., as the increase or change in signal quality or channel quality (e.g., $\Delta$CQI) that may be obtained via cancellation of one or more signals and/or muting of one or more signals as indicated by the transmission hypothesis, for example.

According to another example implementation of the method of FIG. 2, the sending, by the user device to the base station, an interference cancellation feedback message may include sending, by the user device to the base station, an interference cancellation feedback message via one or more orthogonal frequency division multiplexing (OFDM) symbols multiplexed with user data sent via uplink communications to the base station.

According to an example implementation, an apparatus may include at least one processor and at least one memory including computer instructions, when executed by the at least one processor, cause the apparatus to: receive, by a user device, a first signal including a first user device-specific signal from a base station and one or more interfering signals, the first user device-specific signal being received based on a first modulation and coding scheme (MCS); determine, by the user device, whether the user device can perform interference cancellation for the one or more interfering signals; send, by the user device to the base station, an interference cancellation feedback message including at least, for each of the one or more interfering signals, an interference cancellation capability indication that indicates whether or not the user device can perform interference cancellation for the interfering signal; receive an updated MCS, wherein the updated MCS is based, at least in part, on the interference cancellation feedback message; and receive, by the user device based on the updated MCS, a second signal including at least a second user device-specific signal in which at least one of a signal muting or an interference cancellation is performed for at least one of the interfering signals.

According to another example implementation, the apparatus being configured to receive a second signal may include the apparatus being configured to: receive, by the user device based on the updated MCS, a second signal including at least a second user device-specific signal in which at least one of the following is performed for the second signal: a signal muting is performed by a neighbor base station for at least a first interfering signal of the one or more interfering signals in which the user device is not capable of performing interference cancellation for the first of the interfering signals; and interference cancellation is performed by the user device to cancel a second of the interfering signals from the second signal if interference cancellation can be performed by the user device for the second interfering signal.

According to another example implementation, the apparatus being configured to determine, by the user device, whether the user device can perform interference cancellation for the one or more interfering signals may include the apparatus being configured to determine, by the user device, whether the user device can decode the one or more interfering signals.

According to another example implementation, wherein the an interference cancellation capability indication is provided for a resource, and for each of a plurality of spatial layers, based on whether or not the user device can decode the interfering signal via each of the spatial layers.

According to another example implementation, the interference cancellation feedback message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be off, and the user device performing interference cancellation for an interfering signal proposed to be On.

According to another example implementation, the interference cancellation feedback message may include for each of one or more transmission hypothesis: an On/Off indication for each of the one or more interfering signals that indicates a proposal to turn the interfering signal On (allow transmission) or off (muted/no transmission) for the transmission hypothesis; an interference cancellation capability indication for the interfering signal that indicates whether the user device can perform interference cancellation for the interfering signal; and a channel quality indication for the transmission hypothesis that indicates an estimated channel quality that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis.

According to another example implementation, the apparatus being configured to send, by the user device to the base station, an interference cancellation feedback message may include the apparatus being configured to: send, by the user device to the base station, an interference cancellation feedback message via one or more orthogonal frequency division multiplexing (OFDM) symbols multiplexed with user data sent via uplink communications to the base station.

According to another example implementation, an apparatus may include: means (602A/602B and/or 604) for receiving, by a user device, a first signal including a first user device-specific signal from a base station and one or more interfering signals, the first user device-specific signal being received based on a first modulation and coding scheme (MCS); means (602A/602B and/or 604) for determining, by the user device, whether the user device can perform interference cancellation for the one or more interfering signals; means (602A/602B and/or 604) for sending, by the user device to the base station, an interference cancellation feedback message including at least, for each of the one or more interfering signals, an interference cancellation capability indication that indicates whether or not the user device can perform interference cancellation for the interfering signal; means (602A/602B and/or 604) for receiving an updated MCS, wherein the updated MCS is based, at least in part, on the interference cancellation feedback message; and means (602A/602B and/or 604) for receiving, by the user device based on the updated MCS, a second signal including at least a second user device-specific signal in which at least one of a signal muting or an interference cancellation is performed for at least one of the interfering signals.

According to another example implementation of the apparatus, the means for receiving a second signal may include means (602A/602B and/or 604) for receiving, by the user device based on the updated MCS, a second signal including at least a second user device-specific signal in which at least one of the following is performed for the second signal: a signal muting is performed by a neighbor base station for at least a first interfering signal of the one or more interfering signals in which the user device is not capable of performing interference cancellation for the first of the interfering signals; and interference cancellation is performed by the user device to cancel a second of the interfering signals from the second signal if interference cancellation can be performed by the user device for the second interfering signal.

According to an example implementation, the means (602A/602B and/or 604) for determining, by the user device, whether the user device can perform interference cancellation for the one or more interfering signals may include means (602A/602B and/or 604) for determining, by the user device, whether the user device can decode the one or more interfering signals.

According to an example implementation of the apparatus, the interference cancellation capability indication is provided for a resource, and for each of a plurality of spatial layers, based on whether or not the user device can decode the interfering signal via each of the spatial layers.

According to an example implementation of the apparatus, the interference cancellation feedback message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be off, and the user device performing interference cancellation for an interfering signal proposed to be On.

According to an example implementation of the apparatus, the interference cancellation feedback message may include for each of one or more transmission hypothesis: an On/Off indication for each of the one or more interfering signals that indicates a proposal to turn the interfering signal On (allow transmission) or off (muted/no transmission) for the transmission hypothesis; an interference cancellation capability indication for the interfering signal that indicates whether the user device can perform interference cancellation for the interfering signal; and a channel quality indication for the transmission hypothesis that indicates an estimated channel quality that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis.

According to an example implementation, the means for sending, by the user device to the base station, an interference cancellation feedback message may include: means (602A/602B and/or 604) for sending, by the user device to the base station, an interference cancellation feedback message via one or more orthogonal frequency division multiplexing (OFDM) symbols multiplexed with user data sent via uplink communications to the base station.

Figure 3:
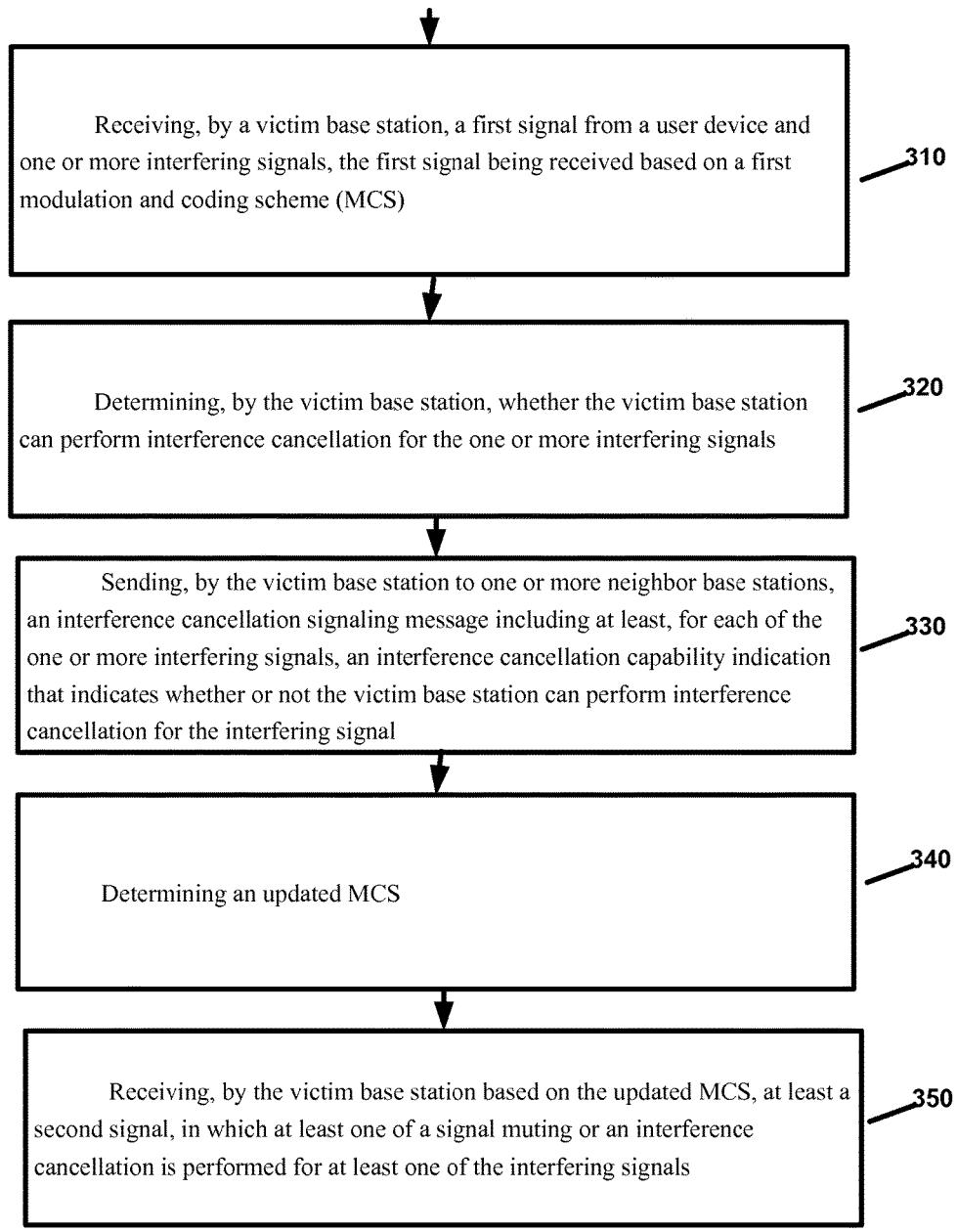
FIG. 3 is a diagram illustrating operation of a base station according to an example implementation.

FIG. 3 is a flow chart illustrating operation of a base station according to an example implementation. Operation 310 may include receiving, by a victim base station (e.g., victim BS 134), a first signal from a user device (e.g., from user device 132) and one or more interfering signals, the first signal being received based on a first modulation and coding scheme (MCS). Thus, for example, the victim BS 134 may receive and decode the first (uplink/UL) signal from the user device based on the first MCS. According to an example implementation, the first signal being received by the victim BS 134 from the user device 132 may be transmitted with the first (or initial) MCS, and decoded by the victim BS 134 using the first (initial) MCS. According to an example implementation, the first signal may include a signal transmitted by user device 132 to BS 134 that may include user device-specific precoding and/or user device-specific multi-input, multi-output (MIMO) weights applied to the signal, where the precoding and/or MIMO weights are specific to user device 132 (e.g., specific to the channel between BS 134 and user device 132), for example.

Operation 320 may include determining, by the victim base station, whether the victim base station can perform interference cancellation for the one or more interfering signals. For example, victim BS 134 may perform channel estimation or otherwise calculate a SINR (signal-to-interference-plus-noise ratio) in order to estimate whether the victim BS 134 is capable of decoding one or more of the interfering signals, e.g., a SINR greater than a threshold may indicate that the BS 134 can decode an interfering signal. Or, the victim BS 134 may determine if it can perform interference cancellation based on whether the BS 134 can decode the interfering signal. If the victim BS 134 can decode an interfering signal, then the victim BS 134 may then perform interference cancellation by subtracting the decoded interfering signal from the signal(s) it received at the same time or via the same time-frequency resources. Similarly, if an interfering signal cannot be decoded, then a post-decoding interference cancellation of such interfering signal may not be possible. Thus, in one illustrative example, a BS may be able to decode (or perform interference cancellation) for an interfering signal if the BS can decode or perform interference cancellation for a signal for each of the spatial layers.

In order to decode an interfering signal(s), the victim BS 134 may, for example, request and then receive from one or more aggressor BSs, the MCS (modulation and coding scheme), scheduling information, spatial layers, etc., for one or more interfering signals. Victim BS 134 may then use channel estimation and/or may attempt to decode the interfering signal(s), e.g., based on the MCS and/or scheduling information received for one or more interfering signals, in order to determine whether the BS 134 can perform interference cancellation on one or more of the interfering signals. These are some illustrative example techniques that may be used by user device 132 to determine if it is capable of performing interference cancellation on one or more interfering signals.

Operation 330 may include sending, by the victim base station to one or more neighbor base stations, an interference cancellation signaling message including at least, for each of the one or more interfering signals, an interference cancellation capability indication that indicates whether or not the victim base station can perform interference cancellation for the interfering signal. For example, the IC (interference cancellation) capability indication may indicate for each interfering signal, either: 1) IC capable to indicate that interference cancellation can be performed (e.g., user device or BS is capable of performing interference cancellation on an interfering signal), or 2) IC not capable to indicate that interference cancellation cannot be performed (e.g., device or BS is not capable of performing interference cancellation on the interfering signal).

Operation 340 may include determining (e.g., by the victim BS 134) an updated MCS (e.g., an updated MCS for use in communicating between the BS 134 and the user device 132). As noted, in operation 330, the victim BS may send to one or more neighbor/aggressor BSs, an interference cancellation signaling message that includes an interference cancellation capability indication for one or more interfering signals (e.g., for signals that may be interfering with communications between user device 132 and BS 134). For example, an interference cancellation signaling message that includes a IC not capable for an interfering signal may be considered (by the aggressor BS) as a muting request for the interfering signal. One or more neighbor/aggressor BSs may then make a muting decision for one or more interfering signals that were identified as IC not capable in the interference cancellation signaling message from the victim BS.

For example, an aggressor BS may determine whether or not to mute an interfering signal based on various criteria or parameters, such as the interference capability indication (e.g., indicating IC not capable, which is interpreted as a muting request from victim BS 134), the priority of the victim cell vs. the priority of the aggressor cell for such resource, the delay of packets/data within the victim cell and the aggressor cell, and the channel quality (e.g., CQI/channel quality indication) or MCS increase or signal gains that may be obtained by the victim cell/victim BS 134 if muting is performed, or based on other criteria.

According to an example implementation, the victim BS 134 may then receive a muting decision from one or more aggressor BSs, e.g., indicating whether or not the aggressor cell will mute the interfering signal. Based on the one or more muting decisions (each indicating whether an aggressor cell will mute an interfering signal), and the determination(s) (made in operation 320) by victim BS 134 as to whether it can perform interference cancellation on one or more interfering signals, and possibly other information, the victim BS 134 may determine an updated MCS. According to an illustrative example implementation, as part of determining an updated MCS, the victim BS 134 may assume that it will perform interference cancellation for any interfering signals where interference cancellation can be performed by the victim BS. Also, as part of determining an updated MCS, the victim BS 134 may also assume that an aggressor BS(s) will mute an interfering signal that the aggressor BS indicated would be muted (e.g., as indicated by the muting decision sent by the aggressor BS to victim BS 134). According to an example implementation, in the absence of a response (e.g., in the absence of a muting response) from the aggressor BS, the victim BS may update the MCS assuming the aggressor has not muted/will not mute the interfering signal.

Thus, in an example implementation of operation 340, based on the (expected) cancellation of one or more interfering signals (by victim BS 134), and/or based on the (expected) muting of one or more interfering signals, the victim BS 134 may determine or estimate a SINR for a signal received from user device 132, and an associated CQI (channel quality indication) and (updated) MCS for such SINR. Thus, for example, based on the cancellation and/or muting of one or more interfering signals, the victim BS 134 may determine/estimate an updated MCS for use in communicating with the user device 132, e.g., which may be a higher MCS, allowing greater data throughput for example (based on the expected muting and/or cancellation of one or more interfering signals for one or more scheduled time/frequency resources).

Operation 350 may include receiving, by the victim base station based on the updated MCS, at least a second signal, in which at least one of a signal muting or an interference cancellation is performed for at least one of the interfering signals. For example, BS 134 may receive and decode a second signal from user device 132 based on the updated MCS.

According to another example implementation of the method of FIG. 3, the receiving, by the victim base station (e.g., by victim BS 134) based on the updated MCS, at least a second signal may include: receiving, by the victim base station based on the updated MCS, at least a second signal, in which at least one of the following is performed for the second signal: a signal muting is performed, in response to the interference cancellation signaling message, by one of the neighbor base stations for at least a first interfering signal of the one or more interfering signals in which the victim base station is not capable of performing interference cancellation for the first interfering signal; and interference cancellation is performed by the victim base station to cancel a second interfering signal of the one or more interfering signals if interference cancellation can be performed by the victim base station for the second interfering signal.

According to another example implementation of the method of FIG. 3, the determining an updated MCS may include determining an updated MCS based, at least in part, on information included in the interference cancellation signaling message. For example, the interference cancellation signaling message, sent by the victim BS 134 to one or more aggressor/neighbor BSs, may indicate IC not capable for one or more interfering signals, which may be considered (e.g., by the aggressor BSs) as a muting request (request to mute the associated interfering signal). The aggressor BSs may make a muting decision for one or more interfering signals that were indicated as IC not capable, for example. This is merely one illustrative example, and the interference cancellation signaling message may include other information/fields.

According to another example implementation of the method of FIG. 3, the determining an updated MCS may include: receiving, by the victim base station from one or more of the neighbor base stations in response to the interference cancellation signaling message, a muting response that indicates whether one or more of the interfering signals will be muted (turned off) by a neighbor base station; and determining the updated MCS based on the muting response from one or more of the neighbor base stations and whether interference cancellation can be performed by the victim base station for one or more of the interfering signals that will not be muted. Thus, for example, the victim BS 134 may determine an updated SINR and/or channel quality, and an associated updated MCS, based on one or more interfering signals being canceled (by victim VS 134) and/or one or more interfering signals being muted (by aggressor BS(s)), for a time/frequency resource, for example.

According to another example implementation of the method of FIG. 3, the interference cancellation capability indication for the interfering signal may include a muting request for the interfering signal.

According to another example implementation of the method of FIG. 3, the method may further include notifying, by the victim BS, the user device of the muting response.

According to another example implementation of the method of FIG. 3, the interference cancellation capability indication for the interfering signal may include a muting request for the interfering signal.

According to another example implementation of the method of FIG. 3, the method may further include the victim BS notifying the victim BS of the updated MCS.

According to another example implementation, an apparatus, may include at least one processor; and at least one non-transitory computer-readable storage medium comprising instructions that, when executed by the at least one processor, are configured to cause the apparatus to perform the method of any the method operations described herein.

According to another example implementation, a computer program product for a computer includes software code portions for performing the steps of any of the method operations described herein when said product is run on the computer.

According to an example implementation, an apparatus may include at least one processor and at least one memory including computer instructions, when executed by the at least one processor, cause the apparatus to: receive, by a victim base station, a first signal from a user device and one or more interfering signals, the first signal being received based on a first modulation and coding scheme (MCS); determine, by the victim base station, whether the victim base station can perform interference cancellation for the one or more interfering signals; send, by the victim base station to one or more neighbor base stations, an interference cancellation signaling message including at least, for each of the one or more interfering signals, an interference cancellation capability indication that indicates whether or not the victim base station can perform interference cancellation for the interfering signal; determine an updated MCS; and receive, by the victim base station based on the updated MCS, at least a second signal, in which at least one of a signal muting or an interference cancellation is performed for at least one of the interfering signals.

According to another example implementation, the apparatus is further configured to: notify, by the victim BS, the user device of the muting response.

According to an example implementation, the interference cancellation capability indication for the interfering signal may include a muting request for the interfering signal. Also, the apparatus may be further configured to notify, by the victim BS, of the updated MCS.

According to an example implementation, an apparatus may include means (602A/602B, 604) for receiving, by a victim base station, a first signal from a user device and one or more interfering signals, the first signal being received based on a first modulation and coding scheme (MCS); means (602A/602B, 604) for determining, by the victim base station, whether the victim base station can perform interference cancellation for the one or more interfering signals; means (602A/602B, 604) for sending, by the victim base station to one or more neighbor base stations, an interference cancellation signaling message including at least, for each of the one or more interfering signals, an interference cancellation capability indication that indicates whether or not the victim base station can perform interference cancellation for the interfering signal; means (602A/602B, 604) for determining an updated MCS; and means (602A/602B, 604) for receiving, by the victim base station based on the updated MCS, at least a second signal, in which at least one of a signal muting or an interference cancellation is performed for at least one of the interfering signals.

According to another example implementation, the means for receiving, by the victim base station based on the updated MCS, at least a second signal may include: means (602A/602B, 604) for receiving, by the victim base station based on the updated MCS, at least a second signal, in which at least one of the following is performed for the second signal: a signal muting is performed, in response to the interference cancellation signaling message, by one of the neighbor base stations for at least a first interfering signal of the one or more interfering signals in which the victim base station is not capable of performing interference cancellation for the first interfering signal; and interference cancellation is performed by the victim base station to cancel a second interfering signal of the one or more interfering signals if interference cancellation can be performed by the victim base station for the second interfering signal.

According to another example implementation of the apparatus, the means for determining an updated MCS may include means (602A/602B, 604) for determining an updated MCS based, at least in part, on information included in the interference cancellation signaling message.

According to another example implementation, the means for determining an updated MCS may include: means (602A/602B, 604) for receiving, by the victim base station from one or more of the neighbor base stations in response to the interference cancellation signaling message, a muting response that indicates whether one or more of the interfering signals will be muted (turned off) by a neighbor base station; and means (602A/602B, 604) for determining the updated MCS based on the muting response from one or more of the neighbor base stations and whether interference cancellation can be performed by the victim base station for one or more of the interfering signals that will not be muted.

According to an example implementation, the apparatus may further include means (602A/602B, 604) for notifying, by the victim BS, the user device of the muting response.

According to another example implementation, the interference cancellation capability indication for the interfering signal may include a muting request for the interfering signal.

According to another example implementation, the apparatus may further include comprising means for notifying, by the victim BS, the user device of the updated MCS.

Figure 4:
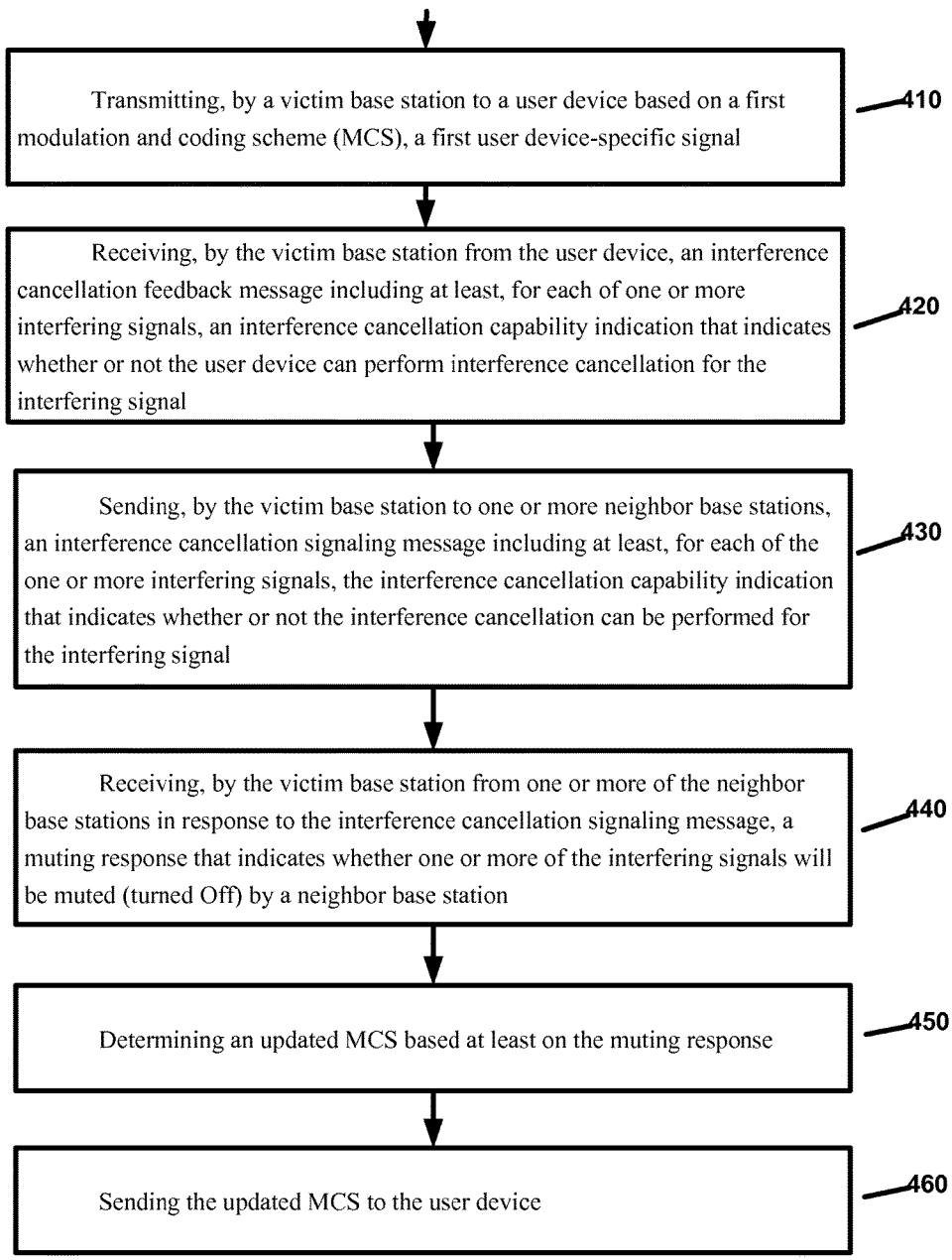
FIG. 4 is a flow chart illustrating operation of a base station according to another example implementation.

FIG. 4 is a flow chart illustrating operation of a base station according to another example implementation. Operation 410 includes transmitting, by a victim base station to a user device based on a first modulation and coding scheme (MCS), a first user device-specific signal. According to an example implementation, the first signal may be transmitted by the victim BS 134 to the user device 132 via the first (or initial) MCS. According to an example implementation, the first signal may include user device-specific precoding and/or user device-specific multi-input, multi-output (MIMO) weights applied to the signal, where the precoding and/or MIMO weights are specific to user device 132 (e.g., specific to the channel between BS 134 and user device 132), for example. During the same time/frequency resources that the first signal is transmitted to the user device, the user device 132 may also receive one or more interfering signals from one or more aggressor/neighbor BSs, for example.

Operation 420 may include receiving, by the victim base station from the user device, an interference cancellation feedback message including at least, for each of one or more interfering signals, an interference cancellation capability indication that indicates whether or not the user device can perform interference cancellation for the interfering signal. According to an example implementation, user device 132 may perform channel estimation or otherwise calculate a SINR (signal-to-interference-plus-noise ratio), or use another technique, to estimate whether the user device is capable of decoding one or more of the interfering signals. If the user device 132 can decode an interfering signal, then the user device can typically decode and then subtract the (decoded) interfering signal from the signal(s) it received at the same time or via the same time-frequency resources. In order to decode an interfering signal(s), the user device 132 may receive the MCS (modulation and coding scheme), scheduling information, spatial layers, etc. for one or more interfering signals. For example, the serving BS (victim BS 134) for user device 132 may request and obtain MCS and scheduling information for one or more interfering signals from one or more aggressor BSs/cells, and may then forward that MCS and scheduling information for interfering signals to the user device 132. User device 132 may then use channel estimation and/or may attempt to decode the interfering signal(s), e.g., based on the MCS and/or scheduling information received for one or more interfering signals. These are some illustrative example techniques that may be used by user device 132 to determine if it is capable of performing interference cancellation on one or more interfering signals.

After the user device 132 determines whether it can perform interference cancellation for one or more interfering signals, the user device 132 may send an interference cancellation feedback message to the victim BS. Thus, at operation 420, the victim BS 134 may receive the interference cancellation feedback message, e.g., including at least, for each of the one or more interfering signals, an interference cancellation capability indication that indicates whether or not the user device can perform interference cancellation for the interfering signal. For example, the interference cancellation feedback message may include for each interfering signal, a field or information element that indicates: IC capable, or IC not capable, where IC refers to interference cancellation. According to one or more other example implementations, the interference cancellation feedback message from the user device 132 to BS 134 may include other fields or other information, as described in greater detail herein.

Operation 430 may include sending, by the victim base station to one or more neighbor base stations, an interference cancellation signaling message including at least, for each of the one or more interfering signals, the interference cancellation capability indication that indicates whether or not the interference cancellation can be performed for the interfering signal. Thus, for example, victim BS 134 may send to one or more aggressor BSs, an interference cancellation signaling message that may include an IC capable or IC not capable, for one or more interfering signals, where, for example, an IC not capable indication may be considered as a muting request for the interfering signal.

Operation 440 may include receiving, by the victim base station from one or more of the neighbor base stations in response to the interference cancellation signaling message, a muting response that indicates whether one or more of the interfering signals will be muted (turned Off) by a neighbor base station. As noted, in operation 430, the victim BS may send to one or more neighbor/aggressor BSs, an interference cancellation signaling message that includes an interference cancellation capability indication for one or more interfering signals (e.g., for signals that may be interfering with communications between user device 132 and BS 134). For example, an interference cancellation signaling message that includes a IC not capable for an interfering signal may be considered (by the aggressor BS) as a muting request for the interfering signal. One or more neighbor/aggressor BSs may then make a muting decision, e.g., for one or more interfering signals that were identified as IC not capable in the interference cancellation signaling message from the victim BS 134. According to an example implementation, the victim BS 134 may then receive a muting decision from one or more aggressor BSs, e.g., indicating whether or not the aggressor cell will mute the interfering signal.

Operation 450 may include determining (e.g., by the victim BS 134) an updated MCS based at least on the muting response. According to an example implementation, based on the one or more muting decisions/muting responses at operation 440 (each indicating whether an aggressor cell will mute an interfering signal), and the interference cancellation feedback message(s) received by victim BS 134 at operation 420 (indicating whether or not the user device 132 can perform interference cancellation on one or more interfering signals), and possibly other information, the victim BS 134 may determine an updated MCS for communicating with the user device 132. According to an illustrative example implementation, as part of determining an updated MCS, the victim BS 134 may assume that it will perform interference cancellation for one or more interfering signals where interference cancellation can be performed by the victim BS 134. Also, as part of determining an updated MCS, the victim BS 134 may also assume that an aggressor BS(s) will mute an interfering signal that the aggressor BS indicated would be muted (e.g., as indicated by the muting decision sent by the aggressor BS to victim BS 134).

Thus, in an example implementation of operation 450, based on the (expected) cancellation of one or more interfering signals (by victim BS 134), and/or based on the (expected) muting of one or more interfering signals (e.g., based on the muting response(s)), the victim BS 134 may determine or estimate a (updated) SINR for a signal (to be) received from user device 132, and an associated CQI (channel quality indication) and (updated) MCS for such SINR, for a scheduled time/frequency resource. Thus, for example, based on the expected cancellation and/or muting of one or more interfering signals for a time/frequency resource, the victim BS 134 may determine/estimate an updated MCS for use in communicating with the user device 132, e.g., which may be a higher MCS, allowing greater data throughput for example (based on the expected muting and/or cancellation of one or more interfering signals for one or more scheduled time/frequency resources).

Operation 460 may include sending the updated MCS to the user device. The user device 132 may then use the updated MCS to receive and decode a (second or future) signal or data from the victim BS 134.

According to an example implementation of the method of FIG. 4, the method may further include transmitting, from the victim base station to the user device, a second signal based on the updated MCS.

According to an example implementation of the method of FIG. 4, the determining the updated MCS may include determining (by the victim BS 134) the updated MCS based at least on the muting response and whether interference cancellation can be performed by the user device to cancel one or more interfering signals.

According to an example implementation of the method of FIG. 4, the interference cancellation signaling message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality (or a signal quality gain/channel quality gain, e.g., $\Delta$CQI or $\Delta$MCS) that would be obtained by the user device based on at least one of: a neighbor base station muting an interfering signal proposed to be Off, and the user device performing interference cancellation for an interfering signal proposed to be On.

According to an example implementation of the method of FIG. 4, the interference cancellation signaling message may include for each of one or more transmission hypothesis: an On/Off indication for each of the one or more interfering signals that indicates a proposal to turn the interfering signal On (allow transmission) or off (muted/no transmission) for the transmission hypothesis; an interference cancellation capability indication for the interfering signal that indicates whether the user device can perform interference cancellation for the interfering signal; and a channel quality indication for the transmission hypothesis that indicates an estimated channel quality (or alternatively an increase in channel quality/signal quality, e.g., $\Delta$CQI or $\Delta$MCS) that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis.

According to an example implementation of the method of FIG. 4, the receiving, by the victim base station from the user device, an interference cancellation feedback message may include: receiving, by the victim base station from the user device, an interference cancellation feedback message via one or more orthogonal frequency division multiplexing (OFDM) symbols multiplexed with user data received via uplink communications to the base station.

According to an example implementation of the method of FIG. 4, the method may further include notifying, by the victim base station, the user device of the muting response.

According to another example implementation, an apparatus may include at least one processor and at least one memory including computer instructions, when executed by the at least one processor, cause the apparatus to: transmit, by a victim base station to a user device based on a first modulation and coding scheme (MCS), a first user device-specific signal; receive, by the victim base station from the user device, an interference cancellation feedback message including at least, for each of one or more interfering signals, an interference cancellation capability indication that indicates whether or not the user device can perform interference cancellation for the interfering signal; send, by the victim base station to one or more neighbor base stations, an interference cancellation signaling message including at least, for each of the one or more interfering signals, the interference cancellation capability indication that indicates whether or not the interference cancellation can be performed for the interfering signal; receive, by the victim base station from one or more of the neighbor base stations in response to the interference cancellation signaling message, a muting response that indicates whether one or more of the interfering signals will be muted (turned Off) by a neighbor base station; determine an updated MCS based at least on the muting response; and send the updated MCS to the user device.

According to another example implementation, the apparatus being configured to determine the updated MCS may include the apparatus being configured to determine the updated MCS based at least on the muting response and whether interference cancellation can be performed by the victim base station to cancel one or more interfering signals.

According to another example implementation, the interference cancellation signaling message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be off, and the user device performing interference cancellation for an interfering signal proposed to be On.

According to another example implementation, the apparatus may include means (602A/602B, 604) for transmitting, by a victim base station to a user device based on a first modulation and coding scheme (MCS), a first user device-specific signal; means (602A/602B, 604) for receiving, by the victim base station from the user device, an interference cancellation feedback message including at least, for each of one or more interfering signals, an interference cancellation capability indication that indicates whether or not the user device can perform interference cancellation for the interfering signal; means (602A/602B, 604) for sending, by the victim base station to one or more neighbor base stations, an interference cancellation signaling message including at least, for each of the one or more interfering signals, the interference cancellation capability indication that indicates whether or not the interference cancellation can be performed for the interfering signal; means (602A/602B, 604) for receiving, by the victim base station from one or more of the neighbor base stations in response to the interference cancellation signaling message, a muting response that indicates whether one or more of the interfering signals will be muted (turned Off) by a neighbor base station; means (602A/602B, 604) for determining an updated MCS based at least on the muting response; and means (602A/602B, 604) for sending the updated MCS to the user device.

According to another example implementation, the apparatus may further include means (602A/602B, 604) for transmitting, from the victim base station to the user device, a second signal based on the updated MCS.

According to another example implementation, the means for determining the updated MCS may include means (602A/602B, 604) for determining the updated MCS based at least on the muting response and whether interference cancellation can be performed by the victim base station to cancel one or more interfering signals.

According to an example implementation, the interference cancellation signaling message may include: an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device; an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be off, and the user device performing interference cancellation for an interfering signal proposed to be On.

According to another example implementation, the interference cancellation signaling message may include for each of one or more transmission hypothesis: an On/Off indication for each of the one or more interfering signals that indicates a proposal to turn the interfering signal On (allow transmission) or off (muted/no transmission) for the transmission hypothesis; an interference cancellation capability indication for the interfering signal that indicates whether the user device can perform interference cancellation for the interfering signal; and a channel quality indication for the transmission hypothesis that indicates an estimated channel quality that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis.

According to an example implementation, the means for receiving, by the victim base station from the user device, an interference cancellation feedback may include: means (602A/602B, 604) for receiving, by the victim base station from the user device, an interference cancellation feedback message via one or more orthogonal frequency division multiplexing (OFDM) symbols multiplexed with user data received via uplink communications to the base station.

According to another example implementation, the apparatus may further include: means (602A/602B, 604) for notifying, by the victim base station, the user device of the muting response.

Figure 5:
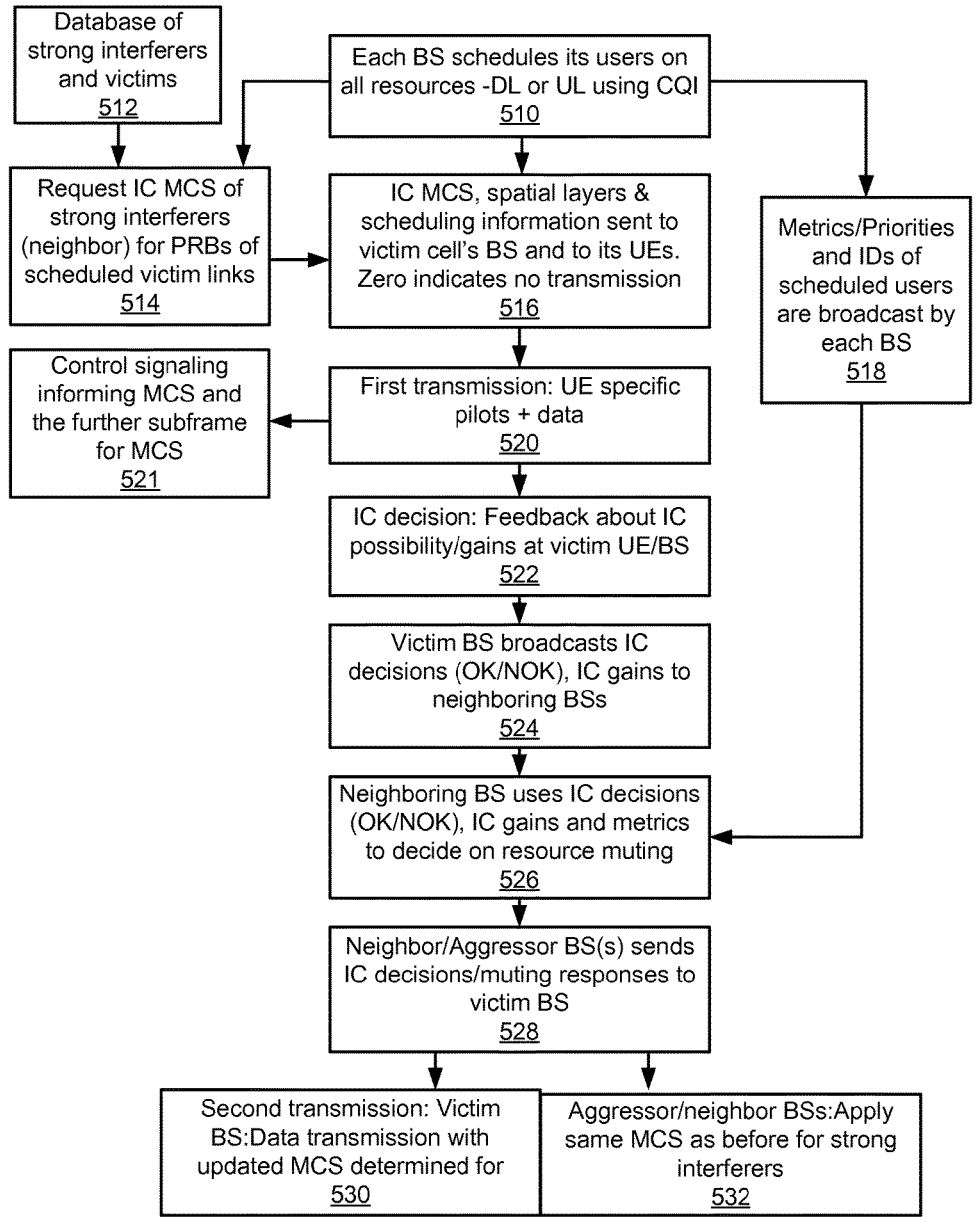
FIG. 5 is a flow chart illustrating operation of a wireless network according to another example implementation.

FIG. 5 is a block diagram illustrating operation of a wireless network according to an example implementation. At 510, each BS may determine a channel quality (e.g., channel quality indication/CQI) for each wireless link between the BS and a user device, and may schedule UL/DL (uplink or downlink) transmissions on a MCS (modulation and coding scheme) in accordance with the determined channel quality/CQI for each wireless link. For example, there may be a MCS associated with each different CQI value, e.g., a higher MCS may be used for a higher CQI/SINR.

At 518, one or more BSs may broadcast the ID (e.g., user device ID, cell ID, BS ID) various metrics (e.g., QoS/quality of service, priority, identification of scheduled resources, . . . ) for one or more users in each cell/BS. For example, the QoS/priority information for each cell (for a particular resource) may be used by neighbor/aggressor BSs to make muting decisions, e.g., based on relative priorities between an aggressor BS and victim BS for the same resource, where an interfering signal from an aggressor BS may be interfering with a victim BS.

At 512, a database of strong interferers is created or established, and updated from time to time, e.g., at a BS(s), or at a core network location/function. A strong interferer may be an interfering signal that has a received signal strength that is greater than a threshold, e.g., as measured by a victim user device or victim BS, for example. For example, a strong interferer/interfering signal may be an interfering signal received by a user device that has a received signal strength that is the same or greater than a received signal from a serving BS. This is an example, and other thresholds may be used. For example, interfering signals that are below the threshold are not considered strong interferers (or strong interfering signals), and may be ignored or disregarded. Thus, according to an example implementation, the user device and BSs may attempt to perform interference cancellation and/or muting of interferers/interfering signals that have a received signal strength greater than the threshold, e.g., only for strong interferers/strong interfering signals. The database of strong interferers may, for example, be generated by a BS or by a core network function, e.g., based on, interference cancellation feedback from user devices and/or based on interference cancellation signaling from BSs, or other signaling or feedback.

At 514, one or more BSs (APs) may request the MCS (and other information) for one or more strong interferers/interfering signals for resource blocks/resources of one or more scheduled victim wireless links, for example. For example, victim BS 134 may send a message to one or more neighbor BSs requesting a list of interfering signals and the MCS, spatial layers and scheduling information, etc., for each interfering signal, for example.

At 516, each neighbor/aggressor cell, e.g., in response to the request at 514, may send a reply (e.g., specifically to the requesting BS or to all nearby/neighbor B Ss) that may include a list of interfering signals generated by or within the neighbor/aggressor cell, and various information for each interfering signal, e.g., which may include a MCS for the interfering signal, spatial layers for the interfering signal, scheduling information (e.g., what time/frequency resources are scheduled for such interfering signals).

At 520, a first signal/transmission may be transmitted, e.g., which may include a user device-specific signal (e.g., user device-specific reference signals, pilots or data) from a victim BS to a user device. As noted above, user device-specific precoding and/or user device-specific MIMO weights may be applied to the first signal transmission at 520. In the uplink direction, a user device 132 may send/transmit a first signal to the victim BS, for example. At 521, the victim BS 134 may send control signaling to the user device 132 to notify the user device 132 of a MCS for transmissions between the user device and victim BS, and may identify a further/future time slot or subframe for a transmission between the victim BS 134 and the user device for which the identified MCS will be used.

At 522, the user device 132 may make IC decisions, e.g., determine whether or not inference cancellation is possible by the user device for one or more interfering signals. The user device may then send an interference cancellation feedback message to the victim BS that may include IC decisions for one or more interfering signals, e.g.: an On/Off indication for each of one or more interfering signals that indicates a request or proposal to turn the interfering signal On or Off (muted), an interference cancellation capability indication (IC capable or IC not capable for the interfering signal), and a channel quality (CQI or MCS) or a signal gain/channel gain (e.g., an increase in channel quality, such as a ΔCQI or ΔMCS) that may be obtained at the victim cell if one or more interfering signals are turned Off and/or one or more signals are canceled, e.g., according to the transmission hypothesis, for example.

At 524, the victim BS 134 may send/broadcast an interference cancellation signaling message, e.g., to one or more neighbor/aggressor BSs that may include, e.g., the information provided in the interference cancellation feedback messages. For example, the victim BS 134 may summarize IC information received via interference cancellation feedback messages from multiple user devices within the victim cell.

At 526, the neighbor/aggressor BSs may make muting decisions for one or more interfering signals, e.g., based on the On/Off indication for each of one or more interfering signals, an interference cancellation capability indication (IC capable or IC not capable for the interfering signal), a channel quality (CQI or MCS) or a signal gain/channel gain, a priority, QoS and/or latency for the victim cell as compared to the priority/QoS and/or latency or packet delay of the neighbor/aggressor BS for the same resources. For example, the neighbor/aggressor BS may make a decision to mute a first interfering signal if the victim BS has a higher priority/QoS than the aggressor BS, and a change (or increase) in channel quality would be obtained by the victim BS/cell that is greater than a threshold if the interfering signal is muted. This is merely one illustrative example of a technique that may be used to make muting decisions, and other techniques, algorithms, etc., may be used by BSs or networks to make muting decisions based on a variety of factors or criteria.

At 528, one or more neighbor/aggressor BSs may send or broadcast its muting decisions, e.g., as a muting response, to the requesting victim BS and/or to multiple neighbor BSs/cells, for example. The muting response or muting decision that may be sent to other BSs (and at least to the requesting victim BS) may indicate, for one or more interfering signals, for example, whether the aggressor cell will mute the interfering signal or not.

At 532, for any non-muted strong interferers/interfering signals, the aggressor/neighbor BS/cell will use the same MCS as before to transmit the interfering signal, e.g., to allow the BS or user device to cancel (or perform interference cancellation) for the interfering signal during a subsequent transmission or subsequent scheduled time/frequency resource for the interfering signal, for example. This is because, for example, a network node, e.g., user device or victim BS, can decode and then perform interference cancellation for an interfering signal typically only when the network node knows the MCS for such interfering signal, for example. Thus, maintaining the same (known by victim cell/BS) MCS for an interfering signal may, at least in some cases, allow the user device or BS to decode and cancel the interfering signal.

At 530, the victim BS may determine an updated MCS for the user device (or for the wireless link between the user device 132 and the victim BS 134) based on the expected muting of one or more interfering signals and/or the expected cancellation of one or more interfering signals. In an example implementation, the victim BS 134 may send the updated MCS to the user device 132. The BS 134 may then perform a second DL transmission to the user device, wherein the user device 132 may use the updated MCS to receive and decode the second signal from the victim BS, wherein for the second signal transmission, one or more interfering signals may be muted by neighbor/aggressor BSs (e.g., based on a muting request sent by the victim BS to neighbor BS(s)) and/or the user device 132 may perform interference cancellation for one or more interfering signals.

In this manner, a multi-cell coordination may be used to coordinate the cancellation and/or muting of one or more interfering signals to allow an increased MCS and as a result, a increased throughput to be accomplished based on an increased SINR and/or decreased signal interference.

FIG. 5 primarily illustrates the coordination of signal cancelling and muting for downlink data transmission from the BS 134 to user device 132. However, a similar process may be used to coordinate signal cancellation and/or muting for the uplink transmission of signals/data from the user device 132 to victim BS 134. Thus, at 522, in the case of uplink data transmission, the victim BS 134 may determine whether it can decode or cancel each of one or more interfering signals, rather than relying upon an interference cancellation feedback message from the user device. Likewise, at 530 for uplink data/signal transmission from user device 132 to BS 134, it is the victim BS 134 that performs the interfering signal cancellation. Thus, many of the other aspects for the downlink data transmission case are the same as or similar to the uplink signal/data transmission case illustrated/described with reference to the diagram in FIG. 5.

Table 1 below illustrates an illustrative example for one or more fields that may be transmitted in an example interference cancellation feedback message (and/or in an example interference cancellation signaling message). In the example of Table 1, fields are shown for only one transmission hypothesis, e.g., a best or preferred transmission hypothesis in which one or more interfering signals may be requested to be muted and/or one or more signals can be cancelled by the user device or victim BS (and thus are not requested to be muted). In field 1, a transmission hypothesis is provided in which a proposal is provided that indicates, for one or more interfering signals, whether the interfering signal should be transmitted or muted. In this example, strong_interferer_1=1 is a request to transmit strong_interferer_1, and strong_interferer_2=0 is a request to mute strong_interferer_2. Field 2 provides an interference capability indication, e.g., including an IC capable/IC not capable for each interfering signal. In this example, IC_strong_interferer_1=1 indicates that the user device or BS can decode and cancel strong_interferer_1, while IC_strong_interferer_2=0 indicates that the user device or victim BS cannot decode/cancel strong_interferer_2. Thus, as shown by field 1, the best transmission hypothesis (e.g., providing the best CQI/MCS) is provided by allowing the strong_interferer_1 to be transmitted (since this signal can be cancelled) while muting IC_strong_interferer_2 (since this signal cannot be cancelled). Also, a CQI (and or a change or delta CQI may be indicated, where the CQI may be the CQI or MCS that may be obtained if the transmission hypothesis is performed, where signal(s) are cancelled and/or muted according to the transmission hypothesis.

TABLE 1

Example fields for best transmission hypothesis, e.g., transmitted in interference cancellation feedback message

| Field 1: Requested TX/muting: (transmission 1/muting = 0) | Field 2: IC capability (IC capable = 1/ IC not capable = 0) | CQI |
|---|---|---|
| Strong interferer_1 = 1 | IC_strong_interferer_1 = 1 | b |
| Strong interferer_2 = 0 | IC_strong_interferer_2 = 0 | |

Table 2 below illustrates another illustrative example for one or more fields that may be transmitted in an example interference cancellation feedback message (and/or in an example interference cancellation signaling message), wherein fields for multiple transmission hypothesis are provided, e.g., to allow aggressor BSs to weigh or consider various criteria to determine whether to mute an interfering signal. Thus, various options or fields are provided for multiple transmission hypothesis, and a different CQI (channel quality indication and or MCS and/or change in channel quality) may be provided for each transmission hypothesis. Thus, for example, if the data of Table 2 indicates that the same, or very nearly the same, CQI/MCS may be obtained regardless whether an interfering signal is muted or not, then the aggressor BS may choose/decide not to mute the interfering signal, e.g., due to the relatively high cost to the aggressor cell (e.g., reduced throughput, increased delay/latency), as compared to relatively minimal benefit to the victim cell. Although this is merely one example.

For example, a CQI of a may be obtained for transmission hypothesis a, where interferer_1 and interferer_2 are transmitted (field 1), and only interferer_2 can be muted (field 2). In the second transmission hypothesis, both interferers are indicated as being muted (field 1), e.g., since both interferers cannot be canceled (field 2). The fourth transmission hypothesis shows the CQI/MCS that would be obtained by the victim cell where interferer_1 is transmitted, and interferer_2 is muted (field 1), wherein only inteferer_1 can be canceled. This last/fourth transmission hypothesis shown in Table 2 would typically render a lower CQI/MCS (as compared to the best transmission hypothesis) because an interferer (interferer_2) is being transmitted that cannot be muted, although this transmission hypothesis may be an option for an aggressor BS.

TABLE 2

Example fields for various/multiple transmission hypotheses, e.g., transmitted in interference cancellation feedback message

| Field 1: Requested TX/muting: (transmission 1/muting = 0) | Field 2: IC capability (IC capable = 1/ IC not capable = 0) | CQI |
|---|---|---|
| Strong interferer_1 = 1 | IC_strong_interferer_1 = 1 | a |
| Strong interferer_2 = 1 | IC_strong_interferer_2 = 0 | |
| Strong interferer_1 = 0 | IC_strong_interferer_1 = 0 | b |
| Strong interferer_2 = 0 | IC_strong_interferer_2 = 0 | |
| Strong interferer_1 = 1 | IC_strong_interferer_1 = 1 | c |
| Strong interferer_2 = 0 | IC_strong_interferer_2 = 0 | |
| Strong interferer_1 = 0 | IC_strong_interferer_1 = 0 | d |
| Strong interferer_2 = 1 | IC_strong_interferer_2 = 0 | |

Figure 6:
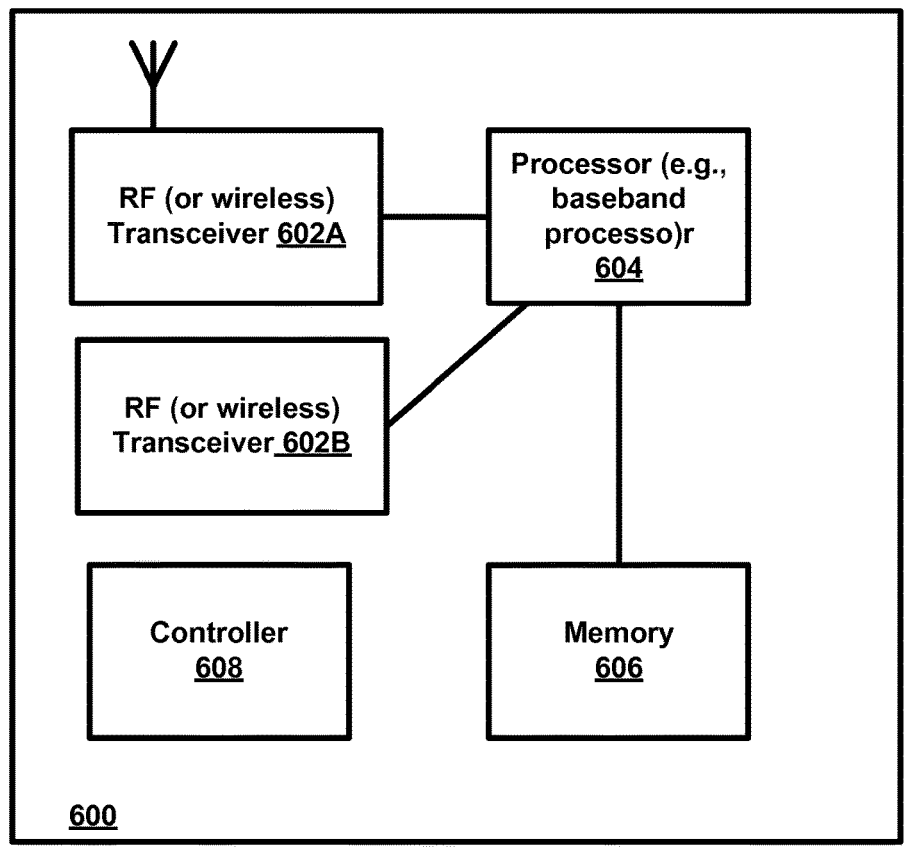
FIG. 6 is a block diagram of a network node (e.g., BS or user device) according to an example implementation.

FIG. 6 is a block diagram of a network node (e.g., BS or user device) 600 according to an example implementation. The network node (or wireless station) 600 may include, for example, two RF (radio frequency) or wireless transceivers 602A, 602B, where each wireless transceiver includes a transmitter to transmit signals and a receiver to receive signals. The wireless station also includes a processor 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602. Processor 604 may control transmission of signals or messages over a wireless network, and may receive signals or messages, etc., via a wireless network (e.g., after being downconverted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the network node 600, and may provide control for other systems not shown in FIG. 6, such as controlling input/output devices (e.g., display, keypad), and/or may execute software for one or more applications that may be provided on network node 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a user device, a first signal including a first user device-specific signal from a base station and one or more interfering signals, the first user device-specific signal being received based on a first modulation and coding scheme (MCS);
   determining, by the user device, whether the user device can perform interference cancellation for the one or more interfering signals, based at least in part on whether the user device can decode the one or more interfering signals;
   sending, by the user device to the base station, an interference cancellation feedback message including at least, for each of the one or more interfering signals, an interference cancellation capability indication that indicates whether or not the user device can perform interference cancellation for the interfering signal;
   receiving an updated MCS, wherein the updated MCS is based, at least in part, on the interference cancellation feedback message; and
   receiving, by the user device based on the updated MCS, a second signal including at least a second user device-specific signal in which at least one of a signal muting or an interference cancellation is performed for at least one of the interfering signals.

2. An apparatus comprising at least one processor and at least one memory including computer instructions, when executed by the at least one processor, cause the apparatus to:
   receive, by a user device, a first signal including a first user device-specific signal from a base station and one or more interfering signals, the first user device-specific signal being received based on a first modulation and coding scheme (MCS);
   determine, by the user device, whether the user device can perform interference cancellation for the one or more interfering signals, based at least in part on whether the user device can decode the one or more interfering signals;
   send, by the user device to the base station, an interference cancellation feedback message including at least, for each of the one or more interfering signals, an interference cancellation capability indication that indicates whether or not the user device can perform interference cancellation for the interfering signal;
   receive an updated MCS, wherein the updated MCS is based, at least in part, on the interference cancellation feedback message; and
   receive, by the user device based on the updated MCS, a second signal including at least a second user device-specific signal in which at least one of a signal muting or an interference cancellation is performed for at least one of the interfering signals.

3. The apparatus of claim 2 wherein the apparatus being configured to receive a second signal comprises the apparatus being configured to:
   receive, by the user device based on the updated MCS, a second signal including at least a second user device-specific signal in which at least one of the following is performed for the second signal:
     a signal muting is performed by a neighbor base station for at least a first interfering signal of the one or more interfering signals in which the user device is not capable of performing interference cancellation for the first of the interfering signals; and
     interference cancellation is performed by the user device to cancel a second of the interfering signals from the second signal if interference cancellation can be performed by the user device for the second interfering signal.

4. The apparatus of any of claim 2 wherein the an interference cancellation capability indication is provided for a resource, and for each of a plurality of spatial layers, based on whether or not the user device can decode the interfering signal via each of the spatial layers.

5. The apparatus of claim 2 wherein the interference cancellation feedback message comprises:

an On/Off indication for each of the one or more interfering signals that indicates a proposal to turn the interfering signal On (allow transmission) or Off (muted/no transmission), an On indication being provided for one or more interfering signals that can be cancelled by the user device, and an Off indication being provided for one or more interfering signals that cannot be cancelled by the user device;

an interference cancellation capability indication for each of the one or more interfering signals that indicates whether the user device can perform interference cancellation for the interfering signal; and a channel quality indication indicates an estimated channel quality that would be obtained by the user device based on at least one of: a neighbor base station muting an interfering signal proposed to be off, and the user device performing interference cancellation for an interfering signal proposed to be On.

6. The apparatus of any of claim 2 wherein the interference cancellation feedback message comprises for each of one or more transmission hypothesis:

an On/Off indication for each of the one or more interfering signals that indicates a proposal to turn the interfering signal On (allow transmission) or off (muted/no transmission) for the transmission hypothesis;

an interference cancellation capability indication for the interfering signal that indicates whether the user device can perform interference cancellation for the interfering signal; and a channel quality indication for the transmission hypothesis that indicates an estimated channel quality that would be obtained by the user device based on at least one of: a neighbor base station muting one or more interfering signals proposed to be Off, and the user device performing interference cancellation for an interfering signal that can be cancelled by the user device and proposed to be On based on the transmission hypothesis.

7. The apparatus of claim 2 wherein the apparatus being configured to send, by the user device to the base station, an interference cancellation feedback message comprises the apparatus being configured to:

send, by the user device to the base station, an interference cancellation feedback message via one or more orthogonal frequency division multiplexing (OFDM) symbols multiplexed with user data sent via uplink communications to the base station.

8. A method comprising:

receiving, by a victim base station, a first signal from a user device and one or more interfering signals, the first signal being received based on a first modulation and coding scheme (MCS);

determining, by the victim base station, whether the victim base station can perform interference cancellation for the one or more interfering signals, based at least in part on whether the victim base station can decode the one or more interfering signals;

sending, by the victim base station to one or more neighbor base stations, an interference cancellation signaling message including at least, for each of the one or more interfering signals, an interference cancellation capability indication that indicates whether or not the victim base station can perform interference cancellation for the interfering signal;

determining an updated MCS; and receiving, by the victim base station based on the updated MCS, at least a second signal, in which at least one of a signal muting or an interference cancellation is performed for at least one of the interfering signals.

9. An apparatus comprising at least one processor and at least one memory including computer instructions, when executed by the at least one processor, cause the apparatus to:

receive, by a victim base station, a first signal from a user device and one or more interfering signals, the first signal being received based on a first modulation and coding scheme (MCS);

determine, by the victim base station, whether the victim base station can perform interference cancellation for the one or more interfering signals, based at least in part on whether the victim base station can decode the one or more interfering signals;

send, by the victim base station to one or more neighbor base stations, an interference cancellation signaling message including at least, for each of the one or more interfering signals, an interference cancellation capability indication that indicates whether or not the victim base station can perform interference cancellation for the interfering signal;

determine an updated MCS; and receive, by the victim base station based on the updated MCS, at least a second signal, in which at least one of a signal muting or an interference cancellation is performed for at least one of the interfering signals.

10. The apparatus of claim 9 wherein the apparatus is further configured to:

notify, by the victim BS, the user device of the muting response.

11. The apparatus of claim 9 wherein the interference cancellation capability indication for the interfering signal comprises a muting request for the interfering signal.

12. The apparatus of claim 9 wherein the apparatus is further configured to notify, by the victim BS, of the updated MCS.

13. A method comprising:

transmitting, by a victim base station to a user device based on a first modulation and coding scheme (MCS), a first user device-specific signal;

receiving, by the victim base station from the user device, an interference cancellation feedback message including at least, for each of one or more interfering signals, an interference cancellation capability indication that indicates whether or not the user device can perform interference cancellation for the interfering signal, the interference cancellation capability indication based at least in part on whether the user device can decode the interfering signal;

sending, by the victim base station to one or more neighbor base stations, an interference cancellation signaling message including at least, for each of the one or more interfering signals, the interference cancellation capability indication that indicates whether or not the interference cancellation can be performed for the interfering signal;

receiving, by the victim base station from one or more of the neighbor base stations in response to the interference cancellation signaling message, a muting response that indicates whether one or more of the interfering signals will be muted (turned Off) by a neighbor base station;

determining an updated MCS based at least on the muting response; and sending the updated MCS to the user device.

14. An apparatus comprising at least one processor and at least one memory including computer instructions, when executed by the at least one processor, cause the apparatus to:

transmit, by a victim base station to a user device based on a first modulation and coding scheme (MCS), a first user device-specific signal;

receive, by the victim base station from the user device, an interference cancellation feedback message including at least, for each of one or more interfering signals, an interference cancellation capability indication that indicates whether or not the user device can perform interference cancellation for the interfering signal, the interference cancellation capability indication based at least in part on whether the user device can decode the interfering signal;

send, by the victim base station to one or more neighbor base stations, an interference cancellation signaling message including at least, for each of the one or more interfering signals, the interference cancellation capability indication that indicates whether or not the interference cancellation can be performed for the interfering signal;

receive, by the victim base station from one or more of the neighbor base stations in response to the interference cancellation signaling message, a muting response that indicates whether one or more of the interfering signals will be muted (turned Off) by a neighbor base station;

determine an updated MCS based at least on the muting response; and send the updated MCS to the user device.

* * * * *